United States Patent [19]

Lütjens et al.

[11] Patent Number: 5,155,168

[45] Date of Patent: Oct. 13, 1992

[54] MOLDING COMPOUNDS CONTAINING OXETANYL GROUPS

[75] Inventors: Holger Lütjens; Dieter Wittmann, both of Cologne; Karl-Erwin Piejko, Bergisch Gladbach; Christian Lindner, Cologne; Gerd Fengler, Krefeld-Traar, all of Fed. Rep. of Germany

[73] Assignee: Bayer Aktiengesellschaft, Leverkusen-Bayerwerk, Fed. Rep. of Germany

[21] Appl. No.: 633,464

[22] Filed: Dec. 24, 1990

[30] Foreign Application Priority Data

Jan. 6, 1990 [DE] Fed. Rep. of Germany ....... 4000233

[51] Int. Cl.⁵ .............................................. C08L 69/00
[52] U.S. Cl. ...................................... 525/67; 525/148; 525/284
[58] Field of Search ........................ 525/67, 148, 284

[56] References Cited

U.S. PATENT DOCUMENTS

| | | | |
|---|---|---|---|
| 3,284,545 | 11/1966 | Cenci et al. ........................ | 525/206 |
| 4,885,335 | 12/1989 | Gallucci ............................. | 525/148 |
| 4,902,743 | 2/1990 | Boutni ................................ | 525/148 |

FOREIGN PATENT DOCUMENTS

| | | |
|---|---|---|
| 0158931 | 3/1985 | European Pat. Off. . |
| 0378862 | 4/1990 | European Pat. Off. . |
| 0378863 | 7/1990 | European Pat. Off. . |
| 2337175 | 10/1977 | France . |
| 156851 | 6/1988 | Japan ....................... 525/67 |
| 1561890 | 3/1980 | United Kingdom . |

*Primary Examiner*—James J. Seidleck
*Assistant Examiner*—David Buttner
*Attorney, Agent, or Firm*—Connolly & Hutz

[57] ABSTRACT

Polymer mixtures of

A) 5 to 98 parts by weight and preferably 20 to 95 parts by weight of an aromatic polycarbonate, B) 2 to 70 parts by weight and preferably 5 to 60 parts by weight of a graft polymer of resin-forming monomers on a particulate diene and/or acrylate rubber having an average particle diameter ($d_{50}$) of from 80 to 800 nm and preferably from 100 to 600 nm, C) 0 to 80 parts by weight and preferably 0.5 to 40 parts by weight of an uncrosslinked thermoplastic vinyl copolymer having a softening temperature above 30° C., in which either the resin-forming monomers in B) or a monomer of the thermoplastic vinyl copolymer C) or both have contained a monomer corresponding to formula (I)

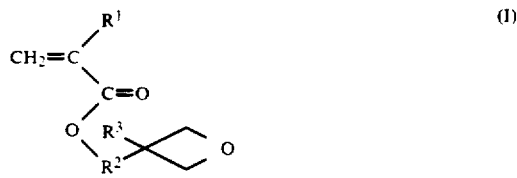

in which $R^1$=H, $CH_3$; $R^2$=$C_{1-8}$ alkylene; $R^3$=$C_{1-4}$ alkylene, in such a quantity that the structural elements containing oxetanyl groups emanating therefrom make up from 0.05 to 5% by weight and the use of the thermoplastic molding compounds.

2 Claims, No Drawings

MOLDING COMPOUNDS CONTAINING OXETANYL GROUPS

This invention relates to molding compounds of thermoplastic aromatic polycarbonates and polymers containing oxetanyl groups.

Molding compounds of polycarbonates (PC) and graft polymers of resin-forming monomers on a rubber (ABS) have long been known (cf. DE-PS 1 170 141 and DE-AS 1 810 993). Improving the weld strength and low-temperature toughness of PC-ABS molding compounds by incorporation of special acrylates in the ABS polymers is the subject of U.S. Pat. No. 4,804,708.

According to U.S. Pat. No. 4,624,986, mixtures of polycarbonates and ABS polymers produced by bulk or bulk suspension polymerization give moldings having a matt surface and good low-temperature properties.

The present invention relates to PC/ABS molding compounds which combine favorable weld strength and toughness at low temperatures and which give moldings having a matt surface.

More particularly, the present invention relates to polymer mixtures of

A) 5 to 98 parts by weight and preferably 20 to 95 parts by weight of an aromatic polycarbonate, B) 2 to 70 parts by weight and preferably 5 to 60 parts by weight of a graft polymer of resin-forming monomers on a particulate diene and/or acrylate rubber having an average particle diameter ($d_{50}$) of from 80 to 800 nm and preferably from 100 to 600 nm, C) 0 to 80 parts by weight and preferably 0.5 to 40 parts by weight of an uncrosslinked thermoplastic vinyl copolymer having a softening temperature above 30° C., in which either the resin-forming monomers in B) or a monomer of the thermoplastic vinyl copolymer C) or both have contained a monomer corresponding to formula (I)

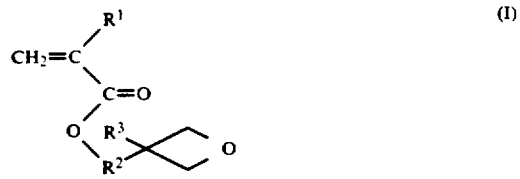

in which $R^1$=H, $CH_3$; $R^2$=$C_{1-8}$ alkylene; $R^3$=$C_{1-4}$ alkylene, in such a quantity that the structural elements containing oxetanyl groups emanating therefrom make up from 0.05 to 5% by weight and preferably from 0.1 to 3% by weight of the polymer mixtures.

The structural elements containing oxetanyl groups are preferably present only in the thermoplastic vinyl copolymer C).

A. Polycarbonates

The polycarbonates A) which represent component A of the mixtures according to the invention are those based on diphenols corresponding to formula (II)

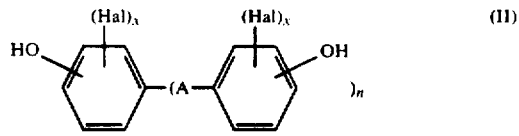

in which A is a single bond, $C_{1-5}$ alkylene, $C_{2-5}$ alkylidene, $C_{5-6}$ cycloalkylidene, —S— or —$SO_2$; Hal is chlorine or bromine, x is 0, 1 or 2 and n is 1 or 0, and optionally to formula (IIa)

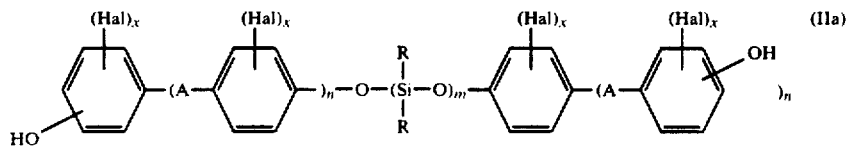

in which A, hal, x and n are as defined for formula (II) and the R's may be the same or different and represent linear $C_{1-20}$ alkyl, branched $C_{3-20}$ alkyl, $C_{6-20}$ aryl groups, preferably $CH_3$, and m is an integer of 5 to 100 and preferably 20 to 80.

Polycarbonates A) are homopolycarbonates and copolycarbonates. The diphenols corresponding to formula (IIa) are only used for the production of copolycarbonates together with the diphenols corresponding to formula (II); they are used in quantities of from 1 to 20% by weight, preferably in quantities of from 1.5 to 15% by weight and, more preferably, in quantities of from 2 to 10% by weight, based on the total diphenols.

The polycarbonates A) may also be mixtures of thermoplastic polycarbonates, in which case the diphenols (IIa), if any, make up from to 20% by weight of the total diphenols in the polycarbonate mixture.

The polycarbonates A) may be produced in known manner, for example by interfacial polycondensation with phosgene or by polycondensation with phosgene in homogeneous phase ("pyridine process"), the molecular weight being regulated in known manner by a corresponding quantity of known chain terminators. (For polydiorganosiloxane-containing polycarbonates, see DE-OS 3 334 872).

Suitable chain terminators are, for example, phenol, p-chlorophenol, p-tert.-butyl phenol or 2,4,6-tribromophenol and also long-chain alkyl phenols, such as 4-(1,3-tetramethylbutyl)-phenol according to DE-OS 2 842 005 or monoalkyl phenol or dialkyl phenols containing in all 8 to 20 carbon atoms in the alkyl substituents according to DE-OS 3 506 472, such as 3,5-di-tert.-butyl phenol, p-isooctyl phenol, p-tert.-octyl phenol, p-dodecyl phenol and 2-(3,5-dimethylheptyl)-phenol and 4-(3,5-dimethylheptyl)-phenol. The necessary quantity of chain terminator is generally from 0.5 mol-% to 10 mol-%, based on the total diphenols corresponding to formula (II) and optionally (IIa).

The polycarbonates have average molecular weights $\overline{M}w$ (weight average, as measured for example by ultracentrifugation or scattered light measurement) in the range from 10,000 to 200,000 g/mol and preferably in the range from 20,000 to 80,000 g/mol.

Suitable diphenols corresponding to formula (II) are, for example, hydroquinone, resorcinol, 4,4-dihydroxydiphenyl, 2,2-bis-(4-hydroxyphenyl)-propane, 2,4-bis-(4-hydroxyphenyl)-2-methyl butane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, 2,2-bis-(3,5-dibromo-4-hydroxyphenyl)-propane.

Preferred diphenols corresponding to formula (II) are 2,2-bis-(4-hydroxyphenyl)-propane, 2,2-bis-(3,5-dichloro-4-hydroxyphenyl)-propane and 1,1-bis-(4-hydroxyphenyl)cyclohexane.

Examples of diphenols corresponding to formula (IIa) are those in which R is methyl, ethyl, propyl, n-butyl, tert.-butyl or phenyl.

Preferred diphenols of formula (IIa) correspond to formula (IIb)

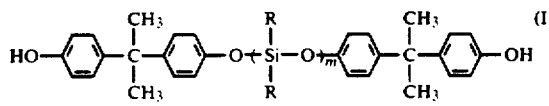

in which the substituents R are the same and have the meaning defined above, but are preferably methyl or phenyl groups, and m is an integer of 5 to 100 and preferably 20 to 80.

The diphenols corresponding to formula (IIa) may be prepared, for example, from the bis-chlorine compounds corresponding to formula (III)

and the diphenols corresponding to formula (II) in accordance with U.S. Pat. No. 3,419,634, column 3, in combination with U.S. Pat. No. 3,189,662.

In the bis-chlorine compounds corresponding to formula (III), R and m have the same meanings as in the diphenols (IIa) and (IIb).

The polycarbonates A) may be branched in known manner, preferably by incorporation of 0.05 to 2.0 mol-%, based on the sum of the diphenols used, of trifunctional or more than trifunctional compounds, for example those containing 3 or more than 3 phenolic groups.

Apart from bisphenol A homopolycarbonate, preferred polycarbonates A) are the copolycarbonates of bisphenol A with up to 15 mol-% (based on the total quantity of diphenols) 2,2-bis-(3,5-dibromo-4-hydroxyphenyl)-propane and the copolycarbonates of diphenols corresponding to formula (II) with 1 to 20% by weight diphenols corresponding to formula (IIa) and preferably to formula (IIb), based on the total diphenols (II) and (IIa) or (IIb).

Graft polymers B) are preferably present in the thermoplastic molding compound in quantities of 2 to 70 parts by weight and more preferably in quantities of 5 to parts by weight.

Their graft shells B.1 consist of polymers of

B1.1 styrenes, α-methyl styrenes, acrylonitrile, $C_{1-4}$ vinyl carboxylic acids, $C_{1-8}$ alkyl acrylates and/or alkyl methacrylates, maleic acid derivatives, vinyl(idene) chloride and mixtures thereof and, optionally, B1.2 monomers corresponding to formula (I)

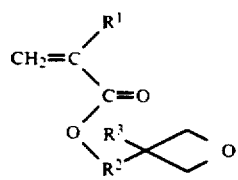

in which
$R^1 = H, CH_3$,
$R^2 = C_{1-8}$ alkylene,
$R^3 = C_{1-4}$ alkyl, the graft shell B.1 having to consist of copolymers of B1.1 and B1.2 if no monomers of formula (I) are incorporated in C), while their B2. graft bases consist of particulate diene and/or acrylate rubbers having an average particle diameter ($d_{50}$) of from 80 to 800 nm and preferably from 100 to 600 nm.

The graft polymers B) are preferably partly crosslinked and have gel contents of >35% by weight and preferably from 60 to 95% by weight. They preferably contain 10 to 95% by weight and more preferably 20 to 90% by weight of the rubber B.2. (For measurement of the particle diameter, see W. Scholtan and H. Lange; Kolloid-Zeitschrift und Zeitschrift für Polymere, 250 (1972), pages 787-796 The gel contents are determined in accordance with M. Hoffman et al., Polymeranalytik I und II, Georg Thieme Verlag, Stuttgart (1977)).

Preferred graft shells are produced from 99 to 50% by weight styrene, α-methyl styrene, p-methyl styrene, acrylonitrile, methyl, n-butyl, cyclohexyl methacrylate, n-butyl acrylate, vinyl acetate and, optionally, 45 to 1% by weight and preferably 30 to 2% by weight monomers corresponding to formula (I) with
$R_1 = H, -CH_3$,
$R_2 = -CH_2-$,
$R_3 = -CH_3; -C_2H_5$.

The monomers corresponding to formula (I) are known.

The graft base B.2 is preferably a generally partly crosslinked diene or alkyl acrylate rubber produced by radical emulsion polymerization and having average particle diameters ($d_{50}$) in the range from 80 to 800 nm and preferably in the range from 100 to 600 nm.

Diene rubbers are, for example, polybutadiene, polyisoprene and copolymers of butadiene with up to 35% by weight comonomers, such as styrene, acrylonitrile, methyl methacrylate, $C_{1-6}$ alkyl acrylate Acrylate rubbers are, for example, crosslinked particulate emulsion polymers of $C_{1-6}$ alkyl acrylates, more particularly $C_{2-6}$ alkyl acrylates, optionally in admixture with up to 15% by weight comonomers, such as styrene, methyl methacrylate, butadiene, vinyl methyl ether, acrylonitriles and at least one polyfunctional crosslinked monomer, for example divinyl benzene, glycol bis-acrylates, bisacrylamides, phosphoric acid triallyl ester, allyl esters of (meth)acrylic acid, triallyl (iso)cyanurate; the acrylate rubbers may contain up to 4% by weight of the crosslinking, comonomers.

The multiphase acrylate rubbers consisting of a highly crosslinked core of diene rubber and a shell of crosslinked acrylate rubber (core-shell rubber) described in DE-OS 3 200 070 are also suitable. The multiphase acrylate rubbers more particularly contain from 0.5 to 10% by weight and preferably from 2 to 4% by weight diene rubber (as core).

The rubbers B.2 have gel contents (as a measure of crosslinking) of greater than 35% by weight and preferably from 60 to 95% by weight.

The graft polymers B) may be prepared in known manner by aqueous polymerization with radical-forming initiators at temperatures in the range from 50° to 90° C. Suitable initiators are, for example, persulfate, perphosphate, hydroperoxides or azo compounds.

Inorganic, water-soluble initiators are preferred. Anionic emulsifiers based on carboxylic acids, for example salts of oleic acid, stearic acid, resinic acids, abietic acid, and also disproportionated derivatives thereof are advantageously used in the graft polymerization.

The polymerization reaction has to be carried out in such a way that the oxetanyl groups remain intact; for example, strongly acidic (pH<1) and strongly alkaline (pH>12) media and relatively high temperatures must be avoided. Copolymers containing oxetanyl groups which have been produced in aqueous dispersion in mildly alkaline medium are particularly suitable.

Thermoplastic Vinyl Polymers C)

The polymer mixtures according to the invention contain thermoplastic vinyl copolymers C) in quantities of 0 to 80 parts by weight and preferably in quantities of 0.5 to 40 parts by weight. The polymers in question are polymers which are uncrosslinked, have softening temperatures above 30° C. and more particularly above 50° C. and are thermoplastic.

Suitable thermoplastic vinyl copolymers C) consist of polymerized

C1) vinyl monomers, preferably styrene, o-methyl styrene, acrylonitrile, methacrylonitrile, carboxylic acid $C_{1-4}$ vinyl esters, acrylates, methacrylates, maleic acid derivatives, vinyl chloride, vinylidene chloride and, optionally, C2) monomers containing oxetanyl groups corresponding to formula (I), the vinyl copolymers C) having to contain such a monomer in copolymerized form where the graft shells B1) of the graft polymers B) consist exclusively of copolymers of B1.1.

Preferred monomers C1) are styrene, p-methyl styrene, α-methyl styrene, acrylonitrile, methyl methacrylate, n-butyl methacrylate, cyclohexyl methacrylate, n-butyl acrylate, vinyl acetate, maleic anhydride, maleic imide; particularly preferred monomers $C_1$) are styrene, α-methyl styrene, acrylonitrile and methyl methacrylate.

Particularly preferred monomers corresponding to formula (I) are those in which
$R^1 = H, CH_3$,
$R^2 = -CH_2-$,
$R^3 = CH_3, C_2H_5$.

It is preferred to use several thermoplastic vinyl copolymers C) alongside one another, a monomer containing oxetane groups corresponding to formula (I) being incorporated in at least one.

Examples cf thermoplastic vinyl copolymers C) are those of styrene and monomers corresponding to formula (I) and of methyl methacrylate and (I), also terpolymers of styrene, acrylonitrile and (I); of styrene, methyl methacrylate and (I), of α-methyl styrene, acrylonitrile and (I) and also quaternary polymers of α-methyl styrene, methyl methacrylate, acrylonitrile and (I).

The vinyl copolymers C) may contain monomers corresponding to formula (I) incorporated in quantities of up to 50% by weight and preferably in quantities of up to 40% by weight, based on C).

The vinyl copolymers C) may be prepared from the monomers in known manner by radical or thermal polymerization, preferably in organic solvents or in aqueous suspension or in emulsion (cf. DE-AS 2 724 360). The polymerization must be carried out in such a way that the oxetanyl groups remain (at least partly) intact (for example, strongly acidic (pH<1) and strongly alkaline (pH>12) media in combination with relatively high temperatures must be avoided in emulsion polymerization). Thermoplastic resins containing oxetanyl groups, which have been produced in aqueous dispersion in mildly alkali medium, are particularly suitable.

The molecular weights $\overline{M}w$ (weight average) of the copolymers C) are preferably in the range from 3,000 to 800,000 g/mol and more preferably in the range from 10,000 to 500,000 g/mol (as determined by light scattering or sedimentation).

In addition to A), B) and optionally C), the polymer mixtures according to the invention optionally contain effective quantities of typical stabilizers, pigments, flow aids, mold release agents, flameproofing agents and/or antistatic agents. They are prepared by mixing the respective constituents in known manner and melt-compounding or melt-extruding the resulting mixture in typical units, such as internal kneaders, single-screw or twin-screw extruders, at temperatures in the range from 200° to 300° C.

The constituents may be mixed in known manner either successively or simultaneously.

The polymer mixtures according to the invention may be used as thermoplastic molding compounds, for example for the production of moldings of all kinds. More particularly, moldings may be produced by injection molding. Examples of moldings which can be produced from the molding compounds according to the invention are housing parts of all kinds, for example for domestic appliances, such as juice presses, coffee machines and mixers, cover panels and other parts for buildings and parts for motor vehicles.

EXAMPLES

1. Starting Materials

Polycarbonate A

Linear polycarbonate based on bisphenol A having a relative solution viscosity $\eta_{rel}$ of 1.26 to 1.28, as measured in $CH_2Cl_2$ at 25° C. and at a concentration of 0.5 g/100 ml.

Graft Polymer BI

Graft polymer of 55% by weight polybutadiene having an average particle diameter ($d_{50}$) of 380 nm as the graft base and 45% by weight of a graft-polymerized mixture of styrene and acrylonitrile (ratio by weight 72:28) as the graft shell (prepared by emulsion polymerization).

Graft Polymer BII

Graft polymer of 55% by weight polybutadiene having an average particle diameter ($d_{50}$) of 380 nm as the graft base and 45% by weight of a graft-polymerized mixture of styrene, acrylonitrile and the compound (Ia)

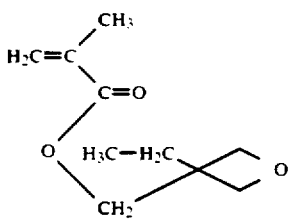

in a ratio by weight of 62:28:10 as the graft shell (prepared by emulsion polymerization).

Vinyl Copolymer C

Notched impact strength at 20° C. and at low temperatures was determined on test specimens measuring 80×10×4 mm by the Izod method according to ISO 180 IA.

Impact strength on both sides of the weld line (gated test specimens measuring 170×10×4 mm) was used to determine weld strength (Charpy method according to DIN 53 453).

Surface gloss was visually evaluated using specimen platelets measuring 60×40×2 mm produced by injection molding at 290° C.

Tables 1 and 2 show that polymers containing oxetane groups give molding compounds which have a matt surface and combine improved weld strength with toughness at low temperatures.

TABLE 1

Composition and properties of the molding compounds

| Example | Components polycarbonate A % by wt. | Components Graft polymer B I % by wt. | Vinyl copolymer C I | Vinyl copolymer C II | Izod notched impact strength in [kJ/m²] 20° C. | Izod notched impact strength in [kJ/m²] −40° C. | Izod notched impact strength in [kJ/m²] −50° C. | Izod notched impact strength in [kJ/m²] −60° C. | Weld strength in [kJ/m²] | Surface |
|---|---|---|---|---|---|---|---|---|---|---|
| 1* | 60 | 24 | 16 | — | 54.8 | 43.7 | 25.4 | — | 6.80 | Glossy |
| 2 | 60 | 24 | 15 | 1 | 53.1 | 46.4 | 32.7 | 19.4 | 6.80 | Matt |
| 3 | 60 | 24 | 14 | 2 | 54.1 | 46.2 | 37.5 | 21.3 | 7.00 | Matt |
| 4 | 60 | 24 | 12 | 4 | 53.1 | 43.5 | 40.3 | 22.8 | 7.70 | Matt |
| 5 | 60 | 24 | 8 | 8 | 52.4 | 41.5 | 40.4 | 23.9 | 9.10 | Matt |

*Comparison Example

TABLE 2

| Example | Components Polycarbonate A % by wt. | Components Graft polymer B % by wt. B I | Components Graft polymer B % by wt. B II | Vinyl copolymer % by wt. C I | Izod notched impact strength in [kJ/m²] 20° C. | Izod notched impact strength in [kJ/m²] −30° C. | Izod notched impact strength in [kJ/m²] −40° C. | Weld strength in [kJ/m²] | Surface |
|---|---|---|---|---|---|---|---|---|---|
| 1 | 60 | | 20 | 20 | 65.0 | 45.2 | 25.0 | 5.00 | Matt |
| 2 (Comp.) | 60 | 20 | | 20 | 62.0 | 44.0 | 24.0 | 4.3 | Glossy |

The molecular weights of the polymers are characterized by the L value:

L value = $(\eta_{rel} - 1) \cdot 0.005$;

where $\eta_{rel}$ is the relative solution viscosity, as measured in dimethyl formamide at 25° C. and at a concentration of 0.005 g/cm³.

Vinyl Copolymer CI

Copolymer of styrene and acrylonitrile in a ratio by weight of 72:28, L value: 60.

Vinyl Copolymer CII

Terpolymer containing oxetanyl groups prepared by aqueous emulsion polymerization of a mixture of styrene, acrylonitrile and the compound of formula (Ia) (see graft polymer BII) in a ratio by weight of 60:10:30 with the sodium salt of disproportionated abietic acid as emulsifier at pH 10. The polymer was isolated by coagulation of the polymer latex with an aqueous magnesium sulfate/sodium acetate/acetic acid solution (pH 4.2) and working up in the usual way. The polymer has an L value of 59.

2. Production and Testing of Molding Compounds

A, B and C are mixed in a 3 liter internal kneader at temperatures in the range from 200° to 220° C. Unless otherwise stated, the moldings were obtained by injection molding at 260° C.

We claim:

1. Polymer mixtures of
   A) 5 to 98 parts by weight of an aromatic polycarbonate,
   B) 2 to 70 parts by weight of a graft polymer of resin-forming monomers in a particulate diene and/or acrylate rubber having an average particle diameter ($d_{50}$) of from 80 to 800 nm,
   C) 0 to 80 parts by weight of an uncrosslinked thermoplastic vinyl copolymer having a softening temperature above 30° C., in which either the resin-forming monomers in B) or a monomer of the thermoplastic vinyl copolymer C) or both contain a monomer corresponding to formula (I)

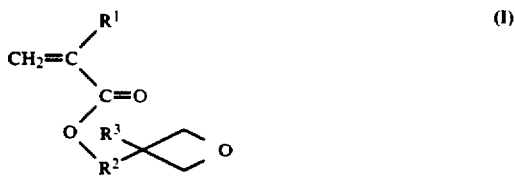

in which $R^1 = H$, $CH_3$; $R^2 = C_{1-8}$ alkylene; $R^3 = C_{1-4}$ alkylene, in such a quantity that (I) makes up from 0.05 to 5% by weight of the polymer mixtures.

2. Polymer mixtures as claimed in claim 1 wherein the particulate diene and/or acrylic rubber has an average particle diameter of from 100 to 600 nm.

* * * * *